(12) United States Patent
Fujinaga et al.

(10) Patent No.: US 9,023,241 B2
(45) Date of Patent: *May 5, 2015

(54) SILICON NITRIDE POWDER FOR SILICONNITRIDE PHOSPHOR, $SR_3AL_3SI_{13}O_2N_{21}$ PHOSPHOR AND β-SIALON PHOSPHOR BOTH OBTAINED USING SAME, AND PROCESSES FOR PRODUCING THESE

(75) Inventors: Masataka Fujinaga, Yamaguchi (JP); Takuma Sakai, Yamaguchi (JP); Shinsuke Jida, Yamaguchi (JP)

(73) Assignee: Ube Industries, Ltd (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/816,634

(22) PCT Filed: Jul. 29, 2011

(86) PCT No.: PCT/JP2011/067509
§ 371 (c)(1),
(2), (4) Date: Feb. 21, 2013

(87) PCT Pub. No.: WO2012/023414
PCT Pub. Date: Feb. 23, 2012

(65) Prior Publication Data
US 2013/0153824 A1    Jun. 20, 2013

(30) Foreign Application Priority Data

Aug. 19, 2010 (JP) ................................. 2010-184041
Aug. 25, 2010 (JP) ................................. 2010-188649

(51) Int. Cl.
*C09K 11/08* (2006.01)
*C09K 11/77* (2006.01)
*C01B 21/068* (2006.01)
*C01B 21/082* (2006.01)

(52) U.S. Cl.
CPC ....... *C09K 11/0838* (2013.01); *Y10T 428/2982* (2015.01); *C01B 21/068* (2013.01); *C01B 21/0826* (2013.01); *C01P 2002/54* (2013.01); *C01P 2004/03* (2013.01); *C01P 2004/52* (2013.01); *C01P 2004/61* (2013.01); *C01P 2006/12* (2013.01); *C01P 2006/80* (2013.01); *C09K 11/7734* (2013.01)

(58) Field of Classification Search
CPC .......... C09K 11/7734; C09K 11/0883; C09K 11/0838; C09K 11/7774; C09K 11/7792; C01B 21/0826; C01B 21/068; C01B 21/0602; C01P 2006/12; C01P 2006/80; C01P 2004/61; C01P 2004/52; C01P 2004/62; H01L 33/502; Y02B 20/181

USPC ............. 252/301.4 F, 301.4 R; 313/483, 486, 313/503; 423/344, 353
See application file for complete search history.

(56) References Cited

U.S. PATENT DOCUMENTS

| 8,147,715 | B2 * | 4/2012 | Hirosaki ................. 252/301.4 F |
| 2002/0164475 | A1 * | 11/2002 | Imamura et al. .............. 428/325 |
| 2008/0297031 | A1 * | 12/2008 | Takahashi et al. ............ 313/503 |
| 2010/0213820 | A1 * | 8/2010 | Sakai et al. .................... 313/501 |
| 2011/0198656 | A1 * | 8/2011 | Emoto et al. .................... 257/98 |
| 2011/0204769 | A1 * | 8/2011 | Fukuda et al. ................ 313/503 |
| 2011/0272187 | A1 * | 11/2011 | Kaga et al. .................... 174/260 |
| 2012/0049115 | A1 * | 3/2012 | Matsuda et al. ........ 252/301.4 F |

FOREIGN PATENT DOCUMENTS

| CN | 1356292 A | 7/2002 |
| CN | 101044223 A | 9/2007 |
| JP | 60-206889 | 10/1985 |
| JP | 09-040406 | 2/1997 |
| JP | 2002-097005 | 4/2002 |
| JP | 2003-112977 | 4/2003 |
| JP | 2005-255895 | 9/2005 |
| JP | 2010-031201 | 2/2010 |
| WO | 2006/080535 A1 | 8/2006 |
| WO | WO 2007066733 A1 * | 6/2007 |
| WO | 2008/062781 A1 | 5/2008 |
| WO | 2009/048150 A1 | 4/2009 |

OTHER PUBLICATIONS http://www.ube-ind.co.jp/english/products/fine/fine_10_01.htm), printed May 28, 2014, UBE Industries product page.*

* cited by examiner

*Primary Examiner* — C Melissa Koslow
*Assistant Examiner* — Lynne Edmondson
(74) *Attorney, Agent, or Firm* — Clark Hill PLC

(57) ABSTRACT

Provided is a silicon nitride powder for siliconitride phosphor having high luminance, a $Sr_3Al_3Si_{13}O_2N_{21}$ phosphor and a β-Sialon phosphor using the powder, which can be used for vacuum fluorescent displays (VFDs), field emission displays (FEDs), plasma display panels (PDPs), cathode ray tubes (CRTs), light emitting diodes (LEDs), or the like, and processes for producing these phosphors. The silicon nitride powder for the siliconitride phosphors is a crystalline silicon nitride powder for use as a raw material for producing siliconitride phosphors including a silicon element, a nitrogen element, and an oxygen element, and has an average particle diameter of 1.0 to 12 μm and an oxygen content of 0.2 to 0.9% by weight.

4 Claims, 1 Drawing Sheet

SILICON NITRIDE POWDER FOR SILICONNITRIDE PHOSPHOR, $Sr_3Al_3Si_{13}O_2N_{21}$ PHOSPHOR AND β-SIALON PHOSPHOR BOTH OBTAINED USING SAME, AND PROCESSES FOR PRODUCING THESE

RELATED/PRIORITY APPLICATION

This application is a National Phase filing regarding International Application No. PCT/JP2011/067509, filed on Jul. 29, 2011, which relies upon Japanese Application No. JP2010-184041, filed on Aug. 19, 2010, and Japanese Patent Application No. 2010-188649, filed on Aug. 25, 2010, for priority.

TECHNICAL FIELD

The present invention relates to a $Sr_3Al_3Si_{13}O_2N_{21}$ phosphor, and a β-Sialon phosphor having β-type $Si_3N_4$ crystal structure, in which the phosphors have improved fluorescent intensity, and are used for displays, a back light for liquid crystal, a fluorescent lamp, a white-light emitting diode, or the like, a method for producing them, and a silicon nitride powder for siliconitride phosphors which is used as a raw material for them.

BACKGROUND ART

Recently, a white-light emitting diode having near ultraviolet to blue-light emitting diode as an excitation source is actively studied. As a green phosphor, a β-Sialon phosphor activated by a rare earth element is reported in Patent Literature 1. The β-Sialon phosphor emits fluorescent light with green color of 525 to 545 nm by excitation with ultraviolet light of 315 nm or less, and a phosphor capable of emitting strong light in response to this excitation wavelength is in need. Meanwhile, Patent Literature 2 discloses a $Sr_3Al_3Si_{13}O_2N_{21}$ phosphor activated by a rare earth element. With regard to such green-light emitting phosphor, emission of strong green fluorescent light by the aforementioned excitation wavelength is also in need.

The phosphor disclosed in Patent Literature 1 is, however, inappropriate for an application since the optimum excitation wavelength is present in an ultraviolet range. Meanwhile, Patent Literature 3 discloses a material capable of emitting strong green fluorescent light according to excitation of a β-Sialon phosphor by near ultraviolet to blue light. Accordingly, those phosphors can be used for vacuum fluorescent displays (VFDs), field emission displays (FEDs) plasma display panels (PDPs), cathode ray tubes (CRTs) white-light emitting diodes (LEDs), or the like, and their use as a phosphor having low luminance degradation is expected.

CITATION LIST

Patent Literature

Patent Literature 1: JP 60-206889 A
Patent Literature 2: JP 2010-31201 A
Patent Literature 3: JP 2005-255895 A

SUMMARY OF INVENTION

Technical Problem

Since the fluorescent intensity of those oxynitride green phosphors is not sufficient yet, development of a $Sr_3Al_3Si_{13}O_2N_{21}$ phosphor and a β-Sialon phosphor, which have high luminance, is in need. In this regard, an object of the present invention, which is devised in view of the problems of conventional techniques described above, is to provide a silicon nitride powder for siliconitride phosphor having high luminance, a $Sr_3Al_3Si_{13}O_2N_{21}$ phosphor and a β-Sialon phosphor using the powder, which can be used for vacuum fluorescent displays (VFDs), field emission displays (FEDs), plasma display panels (PDPs), cathode ray tubes (CRTs), light emitting diodes (LEDs) or the like, and processes for producing these phosphors.

Solution to Problem

The inventors of the invention conducted intensive studies to solve the aforementioned problems, and as a result, found that a $Sr_3Al_3Si_{13}N_{21}$ phosphor and a β-Sialon phosphor, which have excellent fluorescent intensity, can be obtained by using a powder including specific crystalline silicon nitride particles as a raw material, and completed the invention accordingly.

That is, the invention relates to a silicon nitride powder for the siliconitride phosphors, which is a crystalline powder to be used as a raw material for producing siliconitride phosphors comprising a silicon element, a nitrogen element, and an oxygen element, and has an average particle diameter of 1.0 to 12 μm and an oxygen content of 0.2 to 0.9% by weight.

Further, the invention relates to a method for producing a $Sr_3Al_3Si_{13}O_2N_{21}$ phosphor by using the silicon nitride powder for the siliconitride phosphors, and the method includes mixing the silicon nitride powder for the siliconitride phosphors, a material as a strontium source, a material as an aluminum source, and a material as an europium source to have general formula of $(Eu_xSr_{1-x})_3Al_3Si_{13}O_2N_{21}$ and calcining the mixture at 1400 to 2000° C. under a nitrogen atmosphere of 0.05 to 100 MPa.

Further, the invention relates to a $Sr_3Al_3Si_{13}O_2N_{21}$ phosphor prepared by using the silicon nitride powder for the siliconitride phosphors, which is represented by general formula of $(Eu_xSr_{1-x})_3Al_3Si_{13}O_2N_{21}$, and is obtained by calcining a mixed powder comprising the silicon nitride powder for the siliconitride phosphors, a $Sr_3N_2$ powder, an AlN powder, an $Al_2O_3$ powder, and an EuN powder at 1400 to 2000° C. under a nitrogen-containing inert gas atmosphere.

Further, the invention relates to a method for producing a β-Sialon phosphor by using the silicon nitride powder for the siliconitride phosphors, and the method includes mixing the silicon nitride powder for the siliconitride phosphors, a material as an aluminum source, and a material as an europium source to have general formula of $Si_{6-z}Al_zO_zN_{8-z}:Eu_x$ and calcining the mixture at 1400 to 2.000° C. under a nitrogen atmosphere of 0.05 to 100 MPa.

Further the invention relates to a β-Sialon phosphor prepared by using the silicon nitride powder for the siliconitride phosphors, which is represented by general formula of $Si_{6-z}Al_zO_zN_{8-z}:Eu_x$, and is obtained by calcining a mixed powder comprising the silicon nitride powder for the siliconitride phosphors, an AlN powder, an $Al_2O_3$ powder, and an $Eu_2O_3$ powder at 1400 to 2000° C. under a nitrogen-containing inert gas atmosphere.

Advantageous Effects of Invention

As described above, according to the invention, silicon nitride powder for siliconitride phosphor having high luminance, a $Sr_3Al_3Si_{13}O_2N_{21}$ phosphor and a β-Sialon phosphor using the powder, which can be used for vacuum fluorescent displays (VFDs), field emission displays (FEDs), plasma display panels (PDPs), cathode ray tubes (CRTs), light emitting diodes (LEDs), or the like, and processes for producing these phosphors are provided.

DESCRIPTION OF EMBODIMENTS

Figure 1:
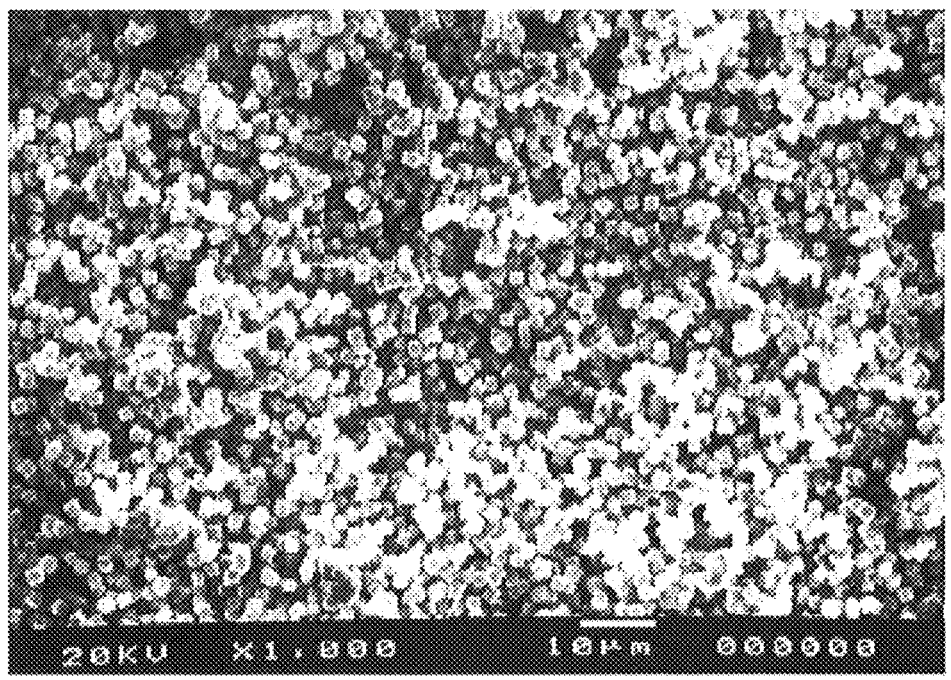
FIG. 1 is a scanning electron microscope image illustrating the particles of a crystalline silicon nitride powder according to Example 1.

The silicon nitride powder for siliconitride phosphor according to the invention is a crystalline silicon nitride powder for use as a raw material for producing a siliconitride phosphor containing a silicon element, a nitrogen element, and an oxygen element and specifically is a $Sr_3Al_3Si_{13}O_2N_{21}$ phosphor or a β-Sialon phosphor. In the present invention, the crystalline silicon nitride is preferably α-type silicon nitride.

An oxygen content in the silicon nitride powder for sill con phosphor according to the invention is 0.2 to 0.9% by weight. Meanwhile, an oxygen content in silicon nitride powder as a raw material for conventional phosphors is 1.0 to 2.0% by weight. In this regard, by using a silicon nitride powder with a low oxygen content as disclosed in the present invention as a raw material for a phosphor, a $Sr_3Al_3Si_{13}O_2N_{21}$ phosphor or a β-Sialon phosphor, in which the phosphors have higher fluorescent intensity than conventional phosphors, can be obtained. The oxygen content in silicon nitride is preferably 0.2 to 0.8% by weight, and more preferably 0.2 to 0.4% by weight. It is difficult to obtain the oxygen content to be equal to or less than 0.2% by weight. On the other hand, when the oxygen content is equal to or greater than 0.9% by weight, no significant improvement in fluorescence properties is observed, an therefore undesirable. Note that, the oxygen content was measured by using an oxygen and nitrogen analyzer manufactured by LECO Corporation.

Further, an average particle diameter of a silicon nitride powder for siliconitride phosphors according to the invention is preferably 1 to 12 μm, and more preferably 1 to 8 μm. When the average particle diameter is less than 1 μm, an oxygen content tends to increase, yielding lower effect resulting from fluorescent properties. When the average particle diameter exceeds 12 μm, it is difficult to produce, and therefore not practical. Note that, the average particle diameter was measured from a scanning electron microscope image according to the following procedures. Specifically, a circle is drawn on a scanning electron microscope image, a maximum-size circle inscribed to a particle in contact with the circle is determined for each particle, and average of the particle diameter, which is determined as the diameter of the circle, is obtained for the particles to calculate the average particle diameter of particles. The number of the particles as a subject for measurement was about 50 to 150.

A specific surface area of the silicon nitride powder for siliconitride phosphors according to the invention is preferably 0.2 to 4.0 m$^2$/g, and more preferably 0.3 to 3.0 m$^2$/g. When the specific surface area of the silicon nitride powder for a siliconitride phosphors according to the invention is less than 0.2 m$^2$/g, production is difficult to achieve, and therefore not practical and inconvenient for obtaining a device containing it. When the specific surface area exceeds 4 m$^2$/g, the effect resulting from fluorescent properties is lowered, and therefore it is preferably 0.2 to 4 m$^2$/g. Note that, the specific surface area was measured by using an apparatus for measuring specific surface area, that is, FLOW SORB 2300 manufactured by Shimadzu Corporation (BET method based on nitrogen gas adsorption).

The silicon nitride powder for siliconitride phosphors according to the invention can be obtained by thermal degradation of a nitrogen-containing silane compound and/or non-crystalline (that is, amorphous) silicon nitride powder. Examples of the nitrogen-containing silane compound include silicon diimide ($Si(NH)_2$), silicon tetraamide, nitrogen imide, silicon chloroimide, and the like. They are produced by a known method, such as a method of reacting a silicon halide, for example, silicon tetrachloride, silicon tetrabromide, or silicon tetraiodide with ammonia in a gas phase, a method of reacting silicon halide in a liquid phase with liquid ammonia, or the like.

Further, as for the amorphous silicon nitride powder, a powder produced by a known method such as heating and decomposing the aforementioned nitrogen-containing silane compound in the temperature range of 1200 to 1460° C. under atmosphere of nitrogen or ammonia gas, a method of reacting a silicon halide such as silicon tetrachloride, silicon tetrabromide, or silicon tetraiodide with ammonia at high temperature, or the like is used. An average particle diameter of the amorphous silicon nitride powder and nitrogen-containing silane compound is generally 0.003 to 0.05 μm.

The nitrogen-containing silane compound and amorphous silicon nitride powder are easily hydrolyzed, and are prone to oxidation. Thus, those raw powder materials are weighed under inert gas atmosphere. With respect to the materials used in the invention, according to a known method for improving materials of a reaction vessel and friction state between a powder and a metal in an apparatus for handling the powder, the metal impurities present in the amorphous silicon nitride powder can be lowered to 10 ppm or less. Further, an oxygen concentration in nitrogen gas purged into a heating furnace used for the amorphous silicon nitride powder can be controlled to the range of 0 to 2.0% by volume. By setting the oxygen concentration in atmosphere during thermal degradation to 100 ppm or less, for example, or preferably 10 ppm or less, amorphous silicon nitride powder having a low oxygen content can be obtained. Lower the oxygen concentration in the amorphous silicon nitride powder is, lower the oxygen content in resulting crystalline silicon nitride particles may be obtained.

Next, by calcining the nitrogen-containing silane compound and/or amorphous silicon nitride powder in the temperature range of 1300 to 1700° C. under a nitrogen or ammonia gas atmosphere, crystalline silicon nitride is obtained. By controlling the condition for calcination (that is, temperature and temperature increase rate), the particle diameter is controlled. According to the invention, in order to obtain crystalline silicon nitride with a low oxygen content, it is necessary to control the oxygen which is simultaneously contained in a nitrogen gas atmosphere used for calcining the nitrogen-containing silane compound to produce amorphous silicon nitride. In order to obtain the crystalline silicon nitride with large particle diameter, it is necessary to slowly increase the temperature, that is, 40° C./hour or less when amorphous silicon nitride powder is calcined into a crystalline silicon nitride powder. The crystalline silicon nitride thus obtained has large primary particles that are approximately in monodispersion state and has no aggregated particles or fused particles, as illustrated in FIG. 1. The obtained crystalline silicon nitride is a highly pure powder having metal impurities of 100 ppm or less. Further, when the crystalline silicon nitride powder is subjected to a chemical treatment, such as an acid washing, a crystalline silicon nitride with a low oxygen content may be obtained. As a result, the silicon nitride powder for siliconitride phosphors according to the invention, in which the oxygen content is 0.2 to 0.9% by weight, may be obtained.

Further, unlike the silicon nitride produced by direct nitridation of metal, silicon, the silicon nitride powder thus obtained does not need strong pulverization. As such, it is characterized in that the impurity amount is very small, that is, it is equal to or less than 100 ppm. The impurities (Al, Ca, and Fe) contained in the silicon nitride powder for siliconitride phosphors according to the invention are equal to or less than 100 ppm, and preferably equal to or less than 20 ppm. Accordingly, a phosphor having high fluorescent intensity may be obtained, and therefore desirable.

Next, a method for producing a $Sr_3Al_3Si_{13}O_2N_{21}$ phosphor by using the silicon nitride powder for siliconitride phosphors according to the invention will be described. The $Sr_3Al_3Si_{13}O_2N_{21}$ phosphors according to the invention indicate phosphors having a crystal structure of $Sr_3Al_3Si_{13}O_2N_{21}$ in which a part of Sr is replaced with a rare earth activating element such as Eu.

The method for producing a $Sr_3Al_3Si_{13}O_2N_{21}$ phosphor according to the invention includes mixing a powder of the crystal no silicon nitride powder having an average particle diameter of 1.0 to 12 μm and an oxygen content of 0.2 to 0.9% by weight, a material such as $Sr_3N_2$ as a strontium source, a material such as AlN and $Al_2O_3$ as an aluminum source, and a material such as EuN as an europium source to have general formula of $(Eu_xSr_{1-x})_3Al_3Si_{13}O_2N_{21}$ and calcining the mixture at 1400 to 2000° C. under nitrogen atmosphere of 0.05 to 100 MPa.

Examples of the material as a strontium source may include a metal strontium as well as strontium nitride ($Sr_3N_2$ and $Sr_2N$). Examples of the material as an aluminum source may include aluminum nitride (AlN), aluminum oxide ($Al_2O_3$), and a metal aluminum. Examples of the material as a europium source may include a metal europium and europium oxide as well as europium nitride.

In the $Sr_3Al_3Si_{13}O_2N_{21}$ phosphor according to the invention, a part of Sr elements may be replaced with Ca or Ba. However, it is preferably Sr.

Further, as a light, source, Mn, Ce, Pr, Nd, Sm, or Yb may be used for light emission in addition to Eu element. However, it is preferable to contain Eu and it is preferably Eu.

The obtained $Sr_3Al_3Si_{13}O_2N_{21}$ phosphor is a phosphor represented by the general formula of $(Eu_xSr_{1-x})_3Al_3Si_{13}O_2N_{21}$ and a part of Sr in $Sr_3Al_3Si_{13}O_2N_{21}$ is replaced with Eu. The replacement amount x is, although not specifically limited, within the range of 0.03<x<0.3 in general.

As for a raw material, generally silicon nitride ($Si_3N_4$) strontium nitride ($Sr_3N_2$) aluminum nitride (AlN), aluminum oxide ($Al_2O_3$) and europium nitride (EuN) are preferably used. As for the process for producing the raw material, any method may be employed as long as it allows obtainment of the nitride products described above as a final product.

Next, the method for producing a β-Sialon phosphor by using the silicon nitride powder for siliconitride phosphors according to the invention will, be described. The β-Sialon phosphor according to the invention indicates a phosphor in which an activation of a rare earth metal, such as Eu is dissolved in solid state in crystals having β-type $Si_3N_4$ crystal structure.

The method for producing a β-Sialon phosphor according to the invention includes mixing a powder of the crystalline silicon nitride powder having an oxygen content of 0.2 to 0.9% by weight, a material such as AlN and $Al_2O_3$ as an aluminum source, and a material such as $Eu_2O_3$ as an europium source to have general formula of $Si_{6-z}Al_zO_zN_{8-z}$:$Eu_x$ and calcining the mixture at 1400 to 2000° C. under nitrogen atmosphere of 0.05 to 100 MPa.

Examples of the material as an aluminum source may include aluminum nitride (AlN), aluminum oxide ($Al_2O_3$), and a metal, aluminum. Examples of the material as an europium source may include a metal europium and europium nitride as well as europium oxide.

Further, as a light source, Nn, Ce, Pr, Nd, Sm, or Yb may be used for light emission in addition to Eu element. However, it is preferable to contain Eu and it is preferably Eu.

The obtained β-Sialon phosphor is a phosphor represented by the general formula of $Si_{6-z}Al_zO_zN_{8-z}$:$Eu_x$. A value of z is preferably in the range of 0.3 to 2.0, and more preferably in the range of 0.3 to 1.0 for giving high fluorescence intensity. The phosphor of the invention in which Eu is dissolved in solid state has excellent green fluorescent characteristics. x is in the range of 0.005 to 0.08 and more preferably in the range of 0.008 to 0.06.

As for a raw material, generally silicon nitride ($Si_3N_4$) europium oxide ($Eu_2O_3$), aluminum nitride (AlN), and aluminum oxide ($Al_2O_3$) are preferably used. As for the method for producing the raw material, any method may be employed as long as it allows obtainment of oxide products described above as a final product.

In the method for producing the $Sr_3Al_3Si_{13}O_2N_{21}$ phosphor and β-Sialon phosphor according to the invention, a method of mixing the starting materials described above is not particularly limited, and a known method, for example, a method of dry mixing them, or a method of wet mixing them in an inert solvent that does not substantially react with respective components of the raw material and then removing the solvent, may be employed. Examples of the mixing device that is suitably used include a V-type mixer, a rocking mixer, a ball mill, a vibration mill and a medium stirring mill.

A mixture of starting materials is calcined at 1400 to 1800° C., preferably from 1500 to 1700° C., under 1 atm in a nitrogen-containing inert gas atmosphere, whereby the desired phosphor is obtained. If the calcining temperature is lower than 1400° C., production of the desired phosphor would require heating for a long time, and thus is not practical, whereas if the calcining temperature exceeds 1800° C., evaporation of strontium, europium, calcium or the like becomes significant, so that a bright phosphor may not be obtained.

The starting materials mixed powder may also be calcined in a temperature range of from 1600 to 2000° C., preferably from 1600 to 1900° C., in a pressurized nitrogen gas atmosphere. In this case, the pressurized nitrogen gas prevents evaporation of europium, and sublimation and decomposition of $Si_3N_4$, and thus a desired phosphor may be obtained in a short time. The calcining temperature may be elevated by increasing the nitrogen gas pressure, for example, the calcination may be carried out, at 1600 to 1850° C. under a nitrogen gas pressure of 5 atm or at 1600 to 2000° C. under a nitrogen gas pressure of 10 atm.

A heating furnace used for the calcining of the powder mixture is not particularly limited, and for example, a batch electric furnace using a high frequency induction heating system or resistance heating system, a rotary kiln, a fluidized firing furnace or a pusher-type electric furnace may be used.

With regard to the methods for producing a powder of $Sr_3Al_3Si_{13}O_2N_{21}$ phosphor and a powder of β-Sialon phosphor, it is preferable to perform a washing treatment in a solution containing an acid after calcination. It is also preferable that, after calcination, a heating treatment in the temperature range of 300 to 1000° C. be performed under atmosphere containing one or more selected from nitrogen, ammonia, and hydrogen.

The powder of $Sr_3Al_3Si_{13}O_2N_{21}$ phosphor thus obtained is represented by general formula of $(M_xSr_{1-x})_3Al_3Si_{13}O_2N_{21}$. Further, regarding M as a light source, Mn, Ce, Pr, Nd, Sm, or Yb may be used for light emission in addition to En element. However, it is preferable to contain Eu and it is preferably Eu. The $Sr_3Al_3Si_{13}O_2N_{21}$ phosphor thus obtained and β-Sialon phosphor represented by $Si_{6-z}Al_zO_zN_{8-z}:Eu_x$ are the phosphors with higher fluorescent intensity as compared with the phosphor obtained by using conventional silicon nitride powder as a raw material.

The $Sr_3Al_3Si_{13}O_2N_{21}$ phosphor according to the invention may be a $Sr_3Al_3Si_{13}O_2N_{21}$ phosphor, in which a part of Sr is replaced with Eu, obtained by calcining the phosphor thus obtained, specifically the mixed powder containing the con nitride powder, $Sr_3N_2$ powder, AlN powder, $Al_2O_3$ powder, and EnN powder, at 1400 to 200° C. under nitrogen-containing inert gas atmosphere.

In addition, the β-Sialon phosphor according to the invention may be a β-Sialon phosphor which is obtained by calcining the phosphor thus obtained, specifically a mixed powder containing the silicon nitride powder, $Al_3O_3$ powder, AlN powder, and $Eu_2O_3$ powder at 1400 to 2000° C. under nitrogen-containing inert gas atmosphere.

By kneading the $Sr_3Al_3Si_{13}O_2N_{21}$ phosphor and β-Sialon phosphor according to the invention with a transparent resin such as an epoxy resin and an acryl resin using a known method, a coating agent may be prepared. Further, by coating the coating agent thus obtained on a light-emitting diode which emits an excitation light, a light conversion type light-emitting diode may be produced and used as a lighting device. It is also possible that, by forming a thin, plate which contains the $Sr_3Al_3Si_{13}O_2N_{21}$ phosphor or β-Sialon phosphor according to the invention and arranging the thin plate such that it can absorb light of a light-emitting diode as an excitation source, a light conversion type light-emitting diode may be produced and also used as a lighting device. A wavelength of the light-emitting diode for use as an excitation source preferably emits light with a wavelength of 300 to 500 nm for exhibition of the characteristics of the $Sr_3Al_3Si_{13}O_2N_{21}$ phosphor or β-Sialon phosphor. Preferably, ultraviolet to blue light with a wavelength of 300 to 470 nm is preferable. Although the $Sr_3Al_3Si_{13}O_2N_{21}$ phosphor or β-Sialon phosphor according to the invention emits green fluorescent light, it is also possible to use it in combination of a phosphor exhibiting other color, that is, a phosphor exhibiting yellow color, a phosphor exhibiting orange color, a phosphor exhibiting red color, or a phosphor exhibiting blue color. When it is combined with those phosphors, the green color component of light emitted by the phosphor according to the invention is increased, and therefore color control may be achieved.

It is also possible to produce an image display device by using the $Sr_3Al_3Si_{13}O_2N_{21}$ phosphor or β-Sialon phosphor according to the invention and an excitation source. In this case, as an excitation source, not only a light-emitting diode but also a light source emitting electronic beam, electric field, vacuum ultraviolet ray, or ultraviolet ray may be employed. The $Sr_3Al_3Si_{13}O_2N_{21}$ phosphor and β-Sialon phosphor according to the invention are characterized in that they exhibit no luminance decrease against those excitation sources. Thus, the materials may be applied for vacuum fluorescent displays (VFDs), field emission displays (FEDs) plasma display panels (PDPs), cathode ray tubes (CRTs), or the like.

EXAMPLES

Hereinafter, the invention will be described in more detail in view of specific examples.

First, in Examples, a specific surface area of a crystalline silicon nitride powder was measured by using an apparatus for measuring the specific surface area, that is, FLOW SORB 2300 manufactured by Shimadzu Corporation, according to a BET method based on a nitrogen gas adsorption. An oxygen content was measured by an oxygen and nitrogen analyzer manufactured by LECO Corporation. Meanwhile, an average particle diameter was measured from a scanning electron microscope image. Specifically, a circle was drawn on a scanning electron microscope image, and for each particle of about 150 particles in contact with the circle, a maximum-size circle inscribed to the particle was determined, and by taking the diameter of the circle as a particle diameter, an average value of the diameter was calculated for the particles and as average particle diameter of particles was obtained accordingly.

Production of a Crystalline Silicon Nitride Powder

Example 1

First, a crystalline silicon nitride powder needed in the invention was produced. The production method was as follows.

By reacting a toluene solution containing silicon tetrachloride in a concentration of 50% by volume with liquid ammonia, silicon diimide having powder volume density (that is, apparent density) of 0.13 g/cm$^3$ was produced and then subjected to thermal degradation at 1150° C. under nitrogen gas atmosphere to obtain an amorphous silicon nitride powder having powder volume density that is, apparent density) of 0.25 g/cm$^3$. In the resulting material, metal impurities present in the amorphous silicon nitride powder were lowered to 10 ppm or less according to a known method for improving materials of a reaction vessel and friction state between powder and a metal in an apparatus or handling the powder. Further, nitrogen gas with the oxygen concentration of 0.5% by volume was purged into the heating furnace.

The amorphous silicon nitride powder was filled in a carbon crucible, and the crucible was gradually heated by a temperature rise schedule of from room temperature to 1100° C. for one hour and from 1100 to 1400° C. at 20° C./hr. After raising the temperature of from 1400 to 1500° C. for one hour and maintaining at 1500° C. for one hour, a crystalline silicon nitride powder according to Example 1 was produced.

The particles of the crystalline silicon nitride powder thus obtained are illustrated in FIG. 1. The specific surface area was 1.0 m$^2$/g the average particle diameter was 3.0 µm, and the oxygen content was 0.72% by weight.

As a result of analyzing the impurities using fluorescent X ray, it was found that Al was 0 ppm, Ca was 16 ppm, and Fe was 16 ppm, indicating extremely small amount of impurities.

Example 2

The nitrogen gas purged into the heating furnace for obtaining an amorphous silicon nitride powder by heating silicon diimide was introduced while the oxygen content in the nitrogen gas was controlled to 0.0006% by volume or less. Other than that, the crystalline silicon nitride powder according to Example 2 was produced in the same manner as Example 1. The specific surface area of the obtained amorphous silicon nitride was 1.0 m$^2$/g, the average particle diameter was 3.0 μm, and the oxygen content was 0.34% by weight.

Example 3

The nitrogen gas purged into the heating furnace for obtaining an amorphous silicon nitride powder by heating silicon diimide was introduced while the oxygen content in the nitrogen gas was controlled to 0.6% by volume. In addition, the temperature for calcining the amorphous silicon nitride was slowly increased from 1100 to 1400° C. in 10° C./h. Other than that, the crystalline silicon nitride powder according to Example 3 was produced in the same manner as Example 1. The specific surface area of the obtained amorphous silicon nitride was 0.3 m$^2$/g, the average particle diameter was 8.0 μm, and the oxygen content was 0.75% by weight.

Example 4

The nitrogen gas purged into the heating furnace for obtaining an amorphous silicon nitride powder by heating silicon diimide was introduced while the oxygen content in the nitrogen gas was controlled to 0.0005% by volume or less. Other than that, the powder of crystalline silicon nitride powder according to Example 4 was produced in the same manner as Example 3. The specific surface area of the obtained amorphous silicon nitride was 0.3 m$^2$/g, the average particle diameter was 8.0 μm, and the oxygen content was 0.29% by weight.

Example 5

The nitrogen gas purged into the heating furnace for obtaining an amorphous silicon nitride powder by heating silicon diimide was introduced while the oxygen content in the nitrogen gas was controlled to 0.5% by volume. In addition, the temperature for calcining the amorphous silicon nitride was slowly increased from 1100 to 1400° C. in 40° C./h. Other than that, the crystalline silicon nitride powder according to Example 5 was produced, in the same manner as Example 1. The specific surface area of the obtained, amorphous silicon nitride was 3.0 m$^2$/g, the average particle diameter was 1.0 μm, and the oxygen content was 0.73% by weight.

Example 6

The crystalline silicon nitride used in Example 5 (the specific surface area was 3.0 m$^2$/g, the average particle diameter was 1.0 μm, and the oxygen content was 0.73% by weight) was added to an acid solution, in which fluoride acid: crystalline silicon nitride=0.5 g:1.0 g, and the mixture was subjected to a ball mill mixing. After ball mill mixing, the mixture was washed with water to produce the crystal line silicon nitride powder according to Example 6. The oxygen content in the obtained crystalline silicon nitride powder was lowered to 0.53% by weight.

Example 7

The nitrogen gas purged into the heating furnace for obtaining an amorphous silicon nitride powder by heating silicon diimide was introduced while the oxygen content in the nitrogen gas was controlled to 0.0006% by volume or less. Other than that, the crystalline silicon nitride powder according to Example 7 was produced in the same manner as Example 5. The specific surface area of the obtained amorphous silicon nitride was 3.0 m$^2$/g, the average particle diameter was 1.0 μm and the oxygen content was 0.33% by weight.

Comparative Example 1

The nitrogen gas purged into the heating furnace for obtaining an amorphous silicon nitride powder by heating silicon diimide was introduced while the oxygen content in the nitrogen gas was controlled to 1.3% by volume. In addition, the temperature for calcining the amorphous silicon nitride was slowly increased from 1100 to 1400° C. in 50° C./h. Other than that, the crystalline silicon nitride powder according to Comparative Example 1 was produced in the same manner as Example 1. The specific surface area of the obtained amorphous silicon nitride was 10 m$^2$/g, the average particle diameter was 0.2 μm, and the oxygen content was 1.34% by weight.

Comparative Example 2

Figure 2:
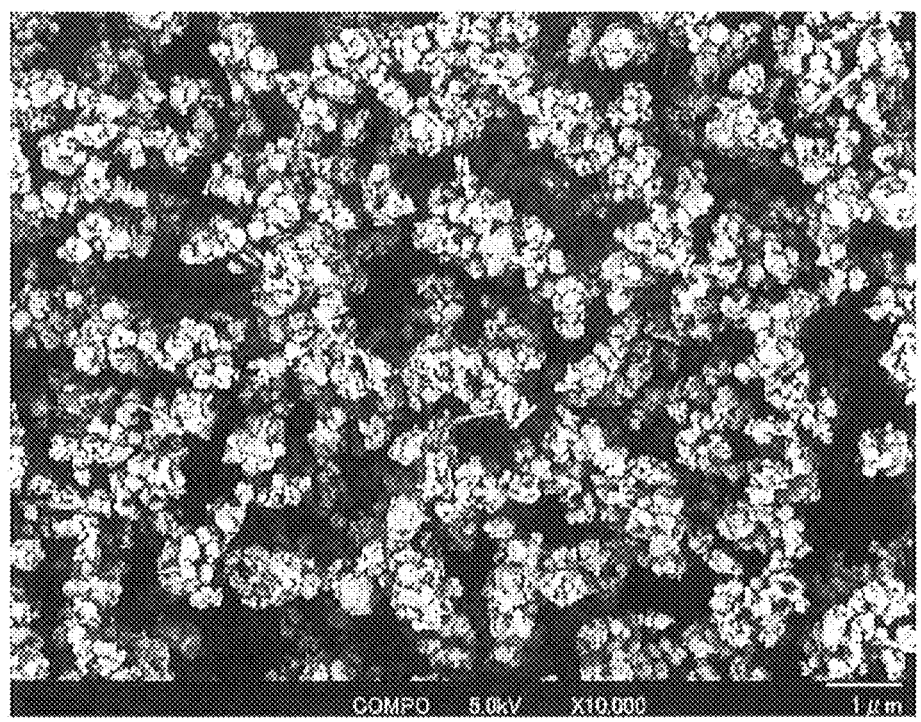
FIG. 2 is a scanning electron microscope image illustrating the particles of a crystalline silicon nitride powder according to Comparative Example 2.

The nitrogen gas purged into the heating furnace for obtaining an amorphous silicon nitride powder by heating silicon diimide was introduced while the oxygen content in the nitrogen gas was controlled to 0.4% by volume. In addition, the temperature for calcining the amorphous silicon nitride was slowly increased from 1100 to 1400° C. in 50° C./h. Other than that, the crystalline silicon nitride powder according to Comparative Example 2 was produced in the same manner as Example 1. The particles of the obtained crystalline silicon nitride are illustrated in FIG. 2. The specific surface area of the obtained amorphous silicon nitride was 10 m$^2$/g, the average particle diameter was 0.2 μm, and the oxygen content was 0.89% by weight.

Comparative Example 3

The nitrogen gas purged into the heating furnace for obtaining an amorphous silicon nitride powder by heating silicon diimide was introduced while the oxygen content in the nitrogen gas was controlled to 2.0% by volume. In addition, the temperature for calcining the amorphous silicon nitride was slowly increased from 1100 to 1400° C. in 40° C./h. Other than that, the crystalline silicon nitride powder according to Comparative Example 3 was produced in the same manner as Example 1. The specific surface area of the obtained amorphous silicon nitride was 3.0 m$^2$/g, the average particle diameter was 1.0 μm, and the oxygen content was 1.65% by weight.

Comparative Example 4

The nitrogen gas purged into the heating furnace for obtaining an amorphous silicon nitride powder by heating silicon diimide was introduced while the oxygen content in the nitrogen gas was controlled to 1.8% by volume. In addition, the temperature for calcining the amorphous sill con nitride was slowly increased from 1100 to 1400° C. in 20°

C./h. Other than that, the crystalline silicon nitride powder according to Comparative Example 4 was produced in the same manner as Example 1. The specific surface area of the obtained amorphous silicon nitride was 1.0 m²/g, the average particle diameter was 3.0 μm and the oxygen content was 1.55% by weight.

Comparative Example 5

The nitrogen gas purged into the heating furnace for obtaining an amorphous silicon nitride powder by heating silicon diimide was introduced while the oxygen content in the nitrogen gas was controlled to 1.6% by volume. In addition, the temperature for calcining the amorphous silicon nitride was slowly increased from 1100 to 1400° C. in 10° C./h. Other than that, the crystalline silicon nitride powder according to Comparative Example 5 was produced in the same manner as Example 1. The specific surface area of the obtained amorphous silicon nitride was 0.3 m²/g, the average particle diameter was 8.0 μm, and the oxygen content was 1.42% by weight.

Production of $Sr_3Al_3Si_{13}O_2N_{21}$ Phosphor

Examples 8 to 14 and Comparative Examples 6 to 10

By using the crystalline silicon nitride powders according to Examples 1 to 7 and Comparative Examples 1 to 5, silicnitride phosphors according to Examples 8 to 14 and Comparative Examples 6 to 10 were prepared. Specifically, a silicon nitride powder, a strontium nitride powder, an aluminum nitride powder, an aluminum oxide powder, and a europium nitride powder were weighed in a nitrogen box to have composition of $Eu_{0.08}Sr_{2.92}Al_3Si_{13}N_{21}$. These raw materials were mixed for one hour using a shaking mill under nitrogen gas atmosphere. The obtained mixture was added to a crucible made of boron nitride. Next, the crucible was set on a pressurized type electric heating furnace. After having vacuum using a rotary oil pump, nitrogen with purity of 99.999% was added to have pressure of 0.8 MPa, and the temperature was increased to 1000° C. for one hour, to 1200° C. for one hour, and to 1825° C. for two hours, that is, total four hours to 1825° C. After maintaining for 8 hours at 1825° C., the furnace was cooled and the crucible was taken out. The synthesized sample was briefly pulverized and subjected to powder X ray diffraction measurement (XRD). As a result, it was found to be a $Sr_3Al_3Si_{13}O_2N_{21}$ phosphor in which a part of Sr is replaced with Eu.

The powder was pulverized by using an agate mortar and pestle, a dry type pulverizer, and a wet type pulverizer. After pulverization to have a pre-determined particle diameter, the fluorescence characteristics were evaluated at excitation of 450 nm by using FP-6500 equipped with an integrating sphere, manufactured by JASCO Corporation.

In Table 1, a specific surface area, an average particle diameter, and an oxygen content of the crystalline silicon nitride powder as a raw material, and also the relative fluorescence intensity of the obtained $Sr_3Al_3Si_{13}O_2N_{21}$ phosphor when the fluorescence intensity of Comparative Example 6 is 100 are summarized.

TABLE 1

| | | Silicon nitride raw material | | | Characteristics of phosphor |
|---|---|---|---|---|---|
| | | Specific surface area (m²/g) | Average particle diameter (μm) | Oxygen content (% by weight) | Fluorescent intensity (relative intensity) |
| Example 8 | Example 1 | 1.0 | 3.0 | 0.72 | 128 |
| Example 9 | Example 2 | 1.0 | 3.0 | 0.34 | 155 |
| Example 10 | Example 3 | 0.3 | 8.0 | 0.75 | 140 |
| Example 11 | Example 4 | 0.3 | 8.0 | 0.29 | 167 |
| Example 12 | Example 5 | 3.0 | 1.0 | 0.73 | 118 |
| Example 13 | Example 6 | 3.0 | 1.0 | 0.53 | 130 |
| Example 14 | Example 7 | 3.0 | 1.0 | 0.33 | 139 |
| Comparative Example 6 | Comparative Example 1 | 10 | 0.2 | 1.34 | 100 |
| Comparative Example 7 | Comparative Example 2 | 10 | 0.2 | 0.89 | 105 |
| Comparative Example 8 | Comparative Example 3 | 3.0 | 1.0 | 1.65 | 88 |
| Comparative Example 9 | Comparative Example 4 | 1.0 | 3.0 | 1.55 | 92 |
| Comparative Example 10 | Comparative Example 5 | 0.3 | 8.0 | 1.42 | 94 |

Production of β-Sialon Phosphor

Examples 15 to 21 and Comparative Examples 11 to 15

By using the crystalline silicon nitride powders according to Examples 1 to 7 and Comparative Examples 1 to 5, silicnitride phosphors according to Examples 15 to 21 and Comparative Examples 11 to 15 were prepared. Specifically, a silicon nitride powder, an aluminum nitride powder, an aluminum oxide powder, and a europium oxide powder were weighed in a nitrogen box to have composition of $Si_{5.25}Al_{0.75}O_{0.786}N_{7.25}:Eu_{0.024}$. These raw materials were mixed for one hour using a shaking mill under nitrogen gas atmosphere. The obtained mixture was added to a crucible made of boron nitride. Next, the crucible was set on a pressurized type electric heating furnace. After having vacuum using a rotary oil pump, nitrogen with purity of 99.999% was added to have pressure of 0.8 MPa, and the temperature was increased to 1000° C. for one hour, to 1200° C. for one hour, and to 1800° C. for two hours, that is, total four hours to 1800° C. After maintaining for 10 hours at 1800° C., the furnace was cooled and the crucible was taken out. The synthesized sample was briefly pulverized and subjected to powder X ray diffraction measurement (XRD). As a result, it was found to be a β-Sialon phosphor activated with Eu rare earth metal.

The powder was pulverized by using an agate mortar and pestle, a dry type pulverizer, and a wet type pulverizer. After pulverization to have a pre-determined particle diameter, the fluorescence characteristics were evaluated at excitation of 450 nm by using FP-6500 equipped with an integrating sphere, manufactured by JASCO Corporation.

In Table 2, a specific surface area, an average particle diameter, and an oxygen content of the crystalline silicon nitride powder as a raw material, and also the relative fluorescence intensity of the obtained β-Sialon phosphor when the fluorescence intensity of Comparative Example 11 is 100 are summarized.

TABLE 2

|  | Silicon nitride raw material | | | Characteristics of phosphor |
|---|---|---|---|---|
|  | Specific surface area (m²/g) | Average particle diameter (μm) | Oxygen content (% by weight) | Fluorescent intensity (relative intensity) |
| Example 15 | Example 1 | 1.0 | 3.0 | 0.72 | 124 |
| Example 16 | Example 2 | 1.0 | 3.0 | 0.34 | 130 |
| Example 17 | Example 3 | 0.3 | 8.0 | 0.75 | 128 |
| Example 18 | Example 4 | 0.3 | 8.0 | 0.29 | 133 |
| Example 19 | Example 5 | 3.0 | 1.0 | 0.73 | 118 |
| Example 20 | Example 6 | 3.0 | 1.0 | 0.53 | 121 |
| Example 21 | Example 7 | 3.0 | 1.0 | 0.33 | 125 |
| Comparative Example 11 | Comparative Example 1 | 10 | 0.2 | 1.34 | 100 |
| Comparative Example 12 | Comparative Example 2 | 10 | 0.2 | 0.89 | 102 |
| Comparative Example 13 | Comparative Example 3 | 3.0 | 1.0 | 1.65 | 87 |
| Comparative Example 14 | Comparative Example 4 | 1.0 | 3.0 | 1.55 | 90 |
| Comparative Example 15 | Comparative Example 5 | 0.3 | 8.0 | 1.42 | 92 |

The invention claimed is:

1. A silicon nitride powder for the siliconitride phosphors, which consists of an α-type crystalline silicon nitride powder to be used as a raw material for producing siliconitride phosphors comprising a silicon element, a nitrogen element, and an oxygen element, and has an average particle diameter of 3.0 to 12 μm, an oxygen content of 0.2 to 0.9% by weight, and a specific surface area of 0.2 to 1.0 m²/g.

2. A method for producing a $Sr_3Al_3Si_{13}O_2N_{21}$ phosphor by using a silicon nitride powder for the siliconitride phosphors, which is a crystalline powder to be used as a raw material for producing siliconnitride phosphors comprising a silicon element, a nitrogen element, and an oxygen element, and has an average particle diameter of 1.0 to 12 μm, an oxygen content of 0.2 to 0.9% by weight, and a specific surface area of 0.2 to 4.0 m²/g, the method comprising:

mixing the silicon nitride powder for the siliconitride phosphors, a material as a strontium source, a material as an aluminum source, and a material as an europium source to have general formula of $(Eu_xSr_{1-x})_3Al_3Si_{13}O_2N_{21}$, (0.03<x<0.3); and calcining the mixture at 1400 to 2000° C. under a nitrogen atmosphere of 0.05 to 100 MPa.

3. A method for producing a β-Sialon phosphor by using a silicon nitride powder for the siliconitride phosphors, which is a crystalline powder to be used as a raw material for producing siliconniride phosphors comprising a silicon element, a nitrogen element, and an oxygen element, and has an average particle diameter of 1.0 to 12 μm, an oxygen content of 0.2 to 0.9% by weight, and a specific surface area of 0.2 to 4.0 m²/g, the method comprising:

mixing the silicon nitride powder for the siliconitride phosphors, a material as an aluminum source, and a material as an europium source to have general formula of $Si_{6-z}Al_zO_zN_{8-z}:Eu_x$, (0.3≤z≤2.0, 0.005≤x≤0.08); and calcining the mixture at 1400 to 2000° C. under a nitrogen atmosphere of 0.05 to 100 MPa.

4. The silicon nitride powder for the siliconnitride phosphors according to claim 1, which is produced by a method comprising calcining an amorphous silicon nitride powder.

* * * * *